No. 894,499. PATENTED JULY 28, 1908.
C. G. HINRICHS.
INSTRUMENT FOR COMPARING AND MEASURING RAYS OF LIGHT.
APPLICATION FILED OCT. 25, 1907.
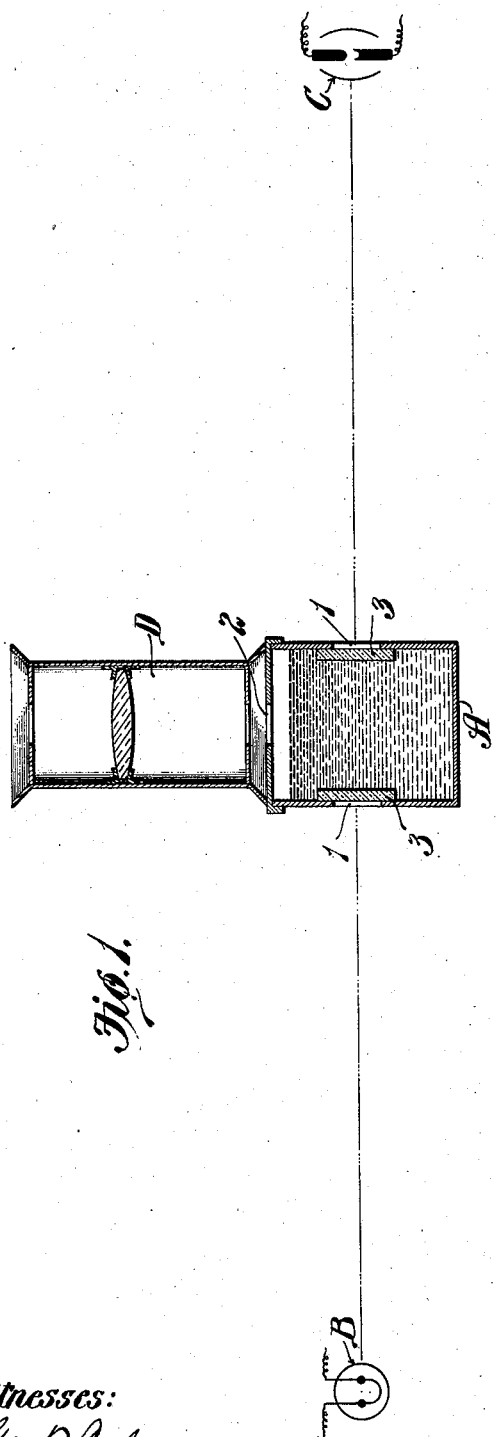
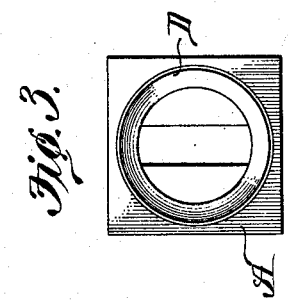
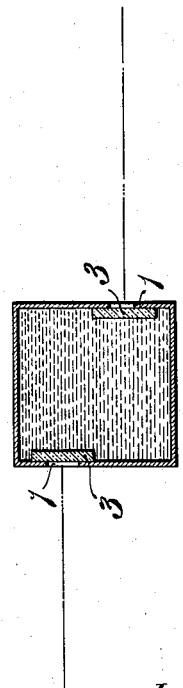
Witnesses:
Inventor,
Carl G. Hinrichs.
By Bakewell Cornwall Attys.

UNITED STATES PATENT OFFICE.

CARL G. HINRICHS, OF ST. LOUIS, MISSOURI.

INSTRUMENT FOR COMPARING AND MEASURING RAYS OF LIGHT.

No. 894,499.  Specification of Letters Patent.  Patented July 28, 1908.

Application filed October 25, 1907. Serial No. 399,149.

*To all whom it may concern:*

Be it known that I, CARL G. HINRICHS, a citizen of the United States, residing at St. Louis, Missouri, have invented a certain new and useful Improvement in Instruments for Comparing and Measuring Rays of Light, of which the following is a full, clear, and exact description, such as will enable others skilled in the art to which it appertains to make and use the same, reference being had to the accompanying drawings, forming part of this specification, in which—

Figure 1 is a vertical sectional view of my instrument, this view being taken on an irregular section line; Fig. 2 is a cross sectional view of the receptacle of said instrument; and Fig. 3 is a top plan view of the instrument shown in Fig. 1.

This invention relates to photometers; namely, instruments used in measuring the intensity of light or comparing the intensities of two lights.

The main object of my invention is to provide an instrument for comparing and measuring the dark light or invisible rays of artificial lights, such, for example, as incandescent electric lights and arc lights.

The artificial lights which are now in general use, such, for example, as incandescent electric lights, and arc lights, are known to be associated with heat and especially with a large amount of dark light or invisible rays which represent not only a great waste of power for their production, but also exert a harmful influence on people who use the lights.

The main object of my invention is to provide an instrument by which the dark light or invisible rays of artificial lights can be made visible to the human eye so that they can be compared and measured.

The practical utility of my instrument is manifest in the fact established by the instrument that modern electric lights now in general use and found by ordinary photometer tests to be equal in intensity, actually differ greatly in the amount of invisible radiation, the radiation in some lights being more than five hundred times greater than in others. In view of the fact that this invisible light affects the human system and is utilized by specialists for curative purposes, the advantage of being able to compare the invisible rays of lights and measure them will be obvious.

With my instruments, which I have termed fluophotometers, an electrical engineer can measure the waste of power in electric lights and also the intensity of the dark light or invisible rays and thus use some means for diminishing this dark light or avoiding it. If it is impossible to prevent the production of this dark light or harmful light the instrument will enable the engineer to select proper screens that will sift out some of this harmful dark light. By means of my fluophotometer a physician using these dark rays for curative purposes can gage or measure the intensity of the power he uses and thus be more certain of attaining the object for which he uses the rays.

While my instrument is particularly adapted for comparing and measuring the dark light or invisible rays of artificial lights it can also be used for measuring ordinary white light or visible light.

Briefly stated, my instrument consists of a receptacle containing fluorescent bodies or substances and having a viewing opening and a plurality of light-admitting openings so located as to permit the passage through said bodies or substances of independent light rays. To compare and measure the dark light or invisible rays of two different lights, I arrange my instrument in such a manner that beams of light from said lights will pass through the fluorescent bodies or substances in the receptacle of the instrument, said substances making the invisible rays of the beams of light in the receptacle visible to the human eye through the viewing opening in the receptacle. These rays can then be measured in the well-known manner, namely, by moving the receptacle till the two beams appear equal in luminosity, measuring the distances from the openings in the sides of the receptacle to the source of each light, and applying the law of the inverse ratio of the distances squared.

Referring to the drawings which illustrate my preferred form of instrument or fluophotometer, A designates a receptacle of approximately cube-shape having a removable top or cover and provided in two of its oppositely disposed side walls with oblong-shaped openings 1 arranged in the same horizontal plane, as shown in Fig. 1, but in different lateral planes, as shown in Fig. 2. That is to say, the openings 1 are on the same level but they are offset or staggered so that beams of light from the two artificial lights B and C, between which the instrument is arranged, can penetrate to the interior of the receptacle and will lie parallel to each other.

The receptacle A may be formed of any suitable material such, for example, as copper and its inside walls are blackened, the removable top or cover being provided with an opening 2 through which the beams of light in the receptacle can be observed. If desired, an ordinary reading telescope D may be arranged over the opening 2 in the top of the receptacle to magnify the rays of light. The receptacle contains a fluorescent body or substance so that the parallel beams of light which enter the receptacle will be visible to the human eye. Almost any of the numerous fluorescent substances, either solid or in solution, can be used. When solid fluorescent substances are used, the instrument can be adjusted or arranged in any position but with liquid fluorescent substances the instrument should be mounted on a level surface or held in a level position unless the receptacle A is so constructed that it can be completely filled with the solution. If the receptacle A is to be completely filled the opening 2 will have a glass cover. For solution in water æsculin and bisulfate of quinin are very serviceable fluorescent substances for fluophotometric purposes, and when æsculin is used the solution should contain not more than 1/200 to 1/300 of a milligram in the cubic centimeter; that is to say, not more than four parts in a million. The most noted fluorescent body, fluorescein, is too intensely fluorescent to be used for measuring the invisible rays of artificial lights but it is admirable material to use in solution when the instrument is to be employed for measuring ordinary visible light, namely, when the instrument is to serve as a common photometer.

Since glass absorbs fluorescent light, the receptacle which contains the solution must admit the beams of light through quartz plates and therefore I prefer to arrange a quartz plate 3 over each of the openings 1 in the side walls of the receptacle. If the instrument is to be used for obtaining only approximate measurements thin glass plates such, for example, as the cover glasses used by microscopists, can be substituted for the quartz plates 3, and if the instrument is to be used merely for measuring visible light with fluorescein solutions, ordinary microscope slides may be used to admit the beams of light to the interior of the receptacle. When solid fluorescent substances are used, such, for example, as a transparent rectangular block of canary glass or a surface coated with powder, no quartz nor other plates are necessary.

As previously stated, while my instrument is particularly adapted for comparing and measuring the invisible rays of artificial lights it can also be used as a photometer for measuring ordinary white lights by increasing the amount of the fluorescent substance in the solution in the receptacle A. It will, of course, be understood that the shape and size of the receptacle A is immaterial so far as my broad idea is concerned, but I prefer to make said receptacle about one inch square and locate the openings 1 so that the parallel rays of light which penetrate the interior thereof will be about $\frac{1}{16}$ of an inch apart, said openings being from $\frac{1}{8}$ to $\frac{1}{4}$ of an inch in width. While it is preferable to have the beams to be compared, parallel to each other, I do not wish it to be understood that it is necessary to the successful operation of my instrument that the beams should be parallel. Furthermore, I do not wish it to be understood that it is necessary to arrange the lights B and C and the instrument in a straight line as the instrument could be arranged out of alinement with the lights B and C especially when solid fluorescent substances are used.

Having thus described my invention, what I claim as new and desire to secure by Letters Patent is:

1. An instrument for comparing rays of light, consisting of a receptacle containing a fluorescent substance and having a viewing opening and a plurality of light-admitting openings so located as to permit the passage through said substance of independent light rays; substantially as described.

2. An instrument for comparing rays of light, comprising a receptacle having oppositely disposed walls in which openings are formed, and a fluorescent body or substance inside of said receptacle; substantially as described.

3. An instrument for comparing rays of light, comprising a receptacle having openings formed in two of its sides and so disposed relatively to each other that beams of light, preferably parallel beams, will penetrate to the interior of the receptacle, and a fluorescent body or substance inside of said receptacle; substantially as described.

4. An instrument for comparing rays of light, comprising a receptacle provided in two of its side walls with openings which are so located relatively to each other that parallel beams of light can enter the receptacle, pieces of glass or quartz covering said openings, and a fluorescent body or substance inside of said receptacle; substantially as described.

5. An instrument for comparing rays of light, comprising a receptacle provided in its top with an opening and in two of its oppositely disposed side walls with openings which are offset or staggered relatively to each other, and a fluorescent body or substance inside of said receptacle; substantially as described.

6. An instrument for comparing rays of different lights, comprising a receptacle the inside walls of which are blackened, said receptacle being provided in two of its oppositely disposed sides with openings through which beams of light can penetrate to the interior of the receptacle, and a fluorescent body or substance inside of said receptacle; substantially as described.

7. An instrument for comparing rays of light, comprising a rectangular-shaped receptacle provided in its top with an opening, a magnifying device arranged over said opening, two of the oppositely disposed side walls of said receptacle being provided with rectangular-shaped openings which are located in approximately the same horizontal plane but in different lateral planes, and a fluorescent body or substance inside of said receptacle; substantially as described.

In testimony whereof I hereunto affix my signature in the presence of two witnesses, this twenty second day of October, 1907.

CARL G. HINRICHS.

Witnesses:
  WELLS L. CHURCH,
  GEORGE BAKEWELL.